TRANSISTOR TEST SET
Filed Dec. 21, 1953 2 Sheets-Sheet 2
FIG. 2 (POS. 1)
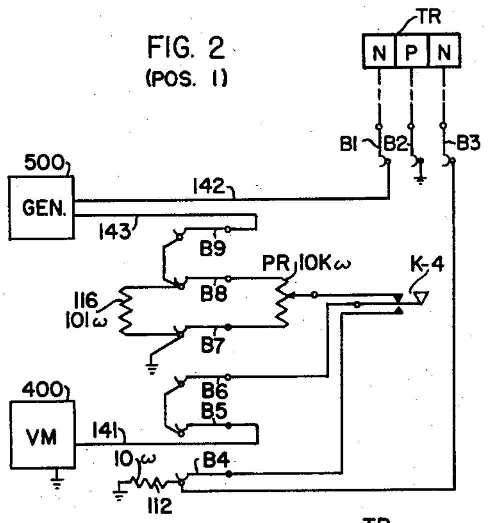
FIG. 3 (POS. 2)
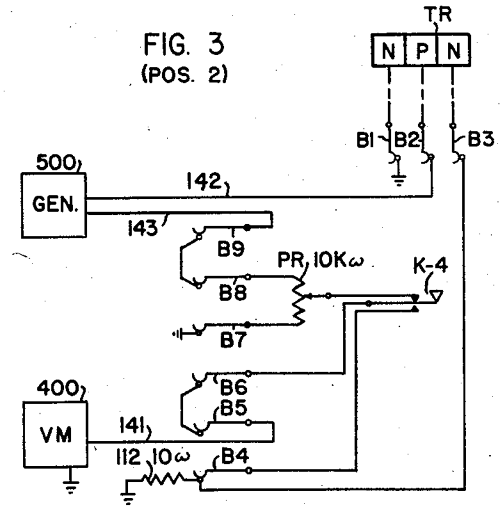
FIG. 4 (POS. 3)
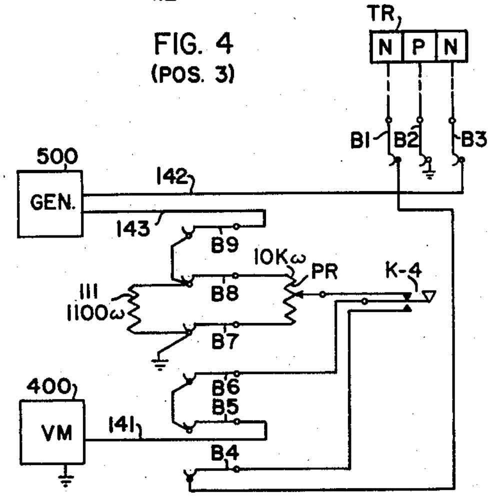
FIG. 5 (POS. 4)
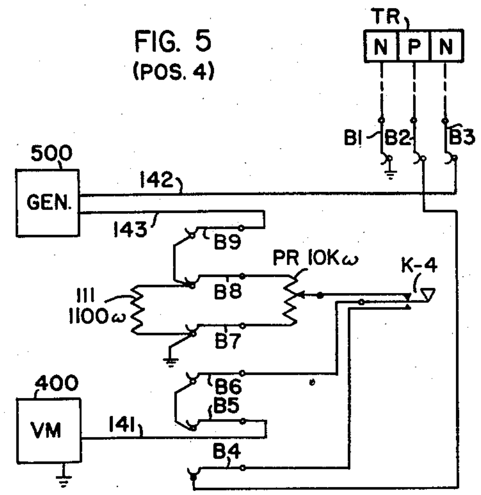
FIG. 6 (POS. 5)
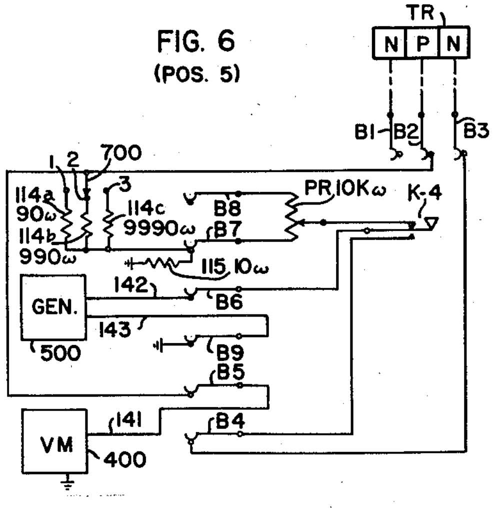
FIG. 7 (POS. 6)
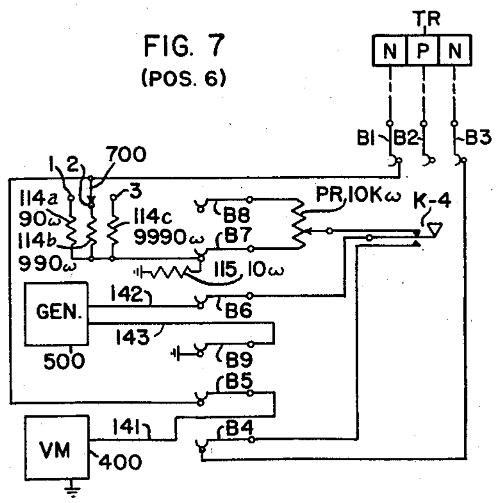

2,907,954
Patented Oct. 6, 1959

2,907,954

TRANSISTOR TEST SET

Arthur J. Radcliffe, Jr., La Grange, Ill., assignor to International Telephone and Telegraph Corporation, a corporation of Maryland Application December 21, 1953, Serial No. 399,560
9 Claims. (Cl. 324—158)

This invention relates to a transistor test set. Its principal object is to provide a simple, reliable, and economical test set for use in determining the important characteristics of a transistor.

GENERAL DESCRIPTION

As commonly produced, a transistor is a semi-conductor triode capable of performing signal-amplifying and related functions. The more common transistors are based on the use of germanium crystal as the semi-conductor.

Physically the common transistor triodes are either of the point-contact type or of the junction type. A point-contact transistor triode employs a single semi-conductor element, termed the base, and two conductors making point contact therewith in close proximity to each other. Either of these point contacts, with the base element, forms a half-wave rectifier (or diode) having a "forward" direction of flow which depends upon which of the two types (N or P) of semi-conductor is used as the base. An N-type base comprises the negative diode element, and a P-type base comprises the positive diode element.

A junction transistor triode may comprise a single semi-conductor crystal in the form of a three-section bar, with the center section comprising the common, or base, electrode. The barrier portions, or films, which separate the base portion from the two end portions have rectifying qualities, wherefore the base portion and either end portion comprises a diode having a directional rectifying action which depends upon the relative crystalline structure of the sections. The two end sections are similar in structure and are either both negative, or are both positive, in rectifying action, with respect to the center, or base section.

From a circuit standpoint, the three electrodes of a transistor triode are termed respectively emitter, base, and collector, the base being the common electrode.

Transistor triodes are further classified, according to diode polarity, as of NPN type or of PNP type. In the NPN type, both emitter and collector are negative with respect to the base, while both the collector and the emitter are positive with respect to the base in the PNP type.

As a transistor is commonly used, the emitter diode is biased by a direct-current which flows in the forward direction therethrough and the collector diode is biased by a direct-current (the power current) which flows in the reverse direction therethrough. The emitter diode is in the signal-input path, while the collector diode is in the signal-output path. Signal-induced variations in the forward biasing current through the emitter diode causes current and/or voltage variations in the reverse biasing current through the collector diode of a higher power than the power required to be expended in the emitter diode to produce them, which characteristic gives rise to the signal amplification obtainable in the transistor.

The following six operational characteristics are generally considered to be of test importance in ascertaining whether any selected transistor will perform satisfactorily in a given circuit situation:

(1) Grounded-base current-gain factor (Alpha or A)—the ratio of output signal current through negligible external output impedance to input signal current, taken with the base grounded and the emitter isolated from ground.

(2) Grounded-emitter current-gain factor (Beta or B)—the ratio of output signal current through negligible external output impedance to input signal current, taken with the emitter grounded and the base isolated from ground.

(3) Base resistance ($Rb$)—the internal resistance of the base electrode.

(4) Emitter resistance ($Re$)—the signal-current resistance of the emitter diode, less the base resistance $Rb$, being the internal emitter electrode resistance to signal current, plus the emitter barrier resistance to signal current.

(5) Collector resistance ($Rc$)—the signal-current resistance of the collector diode.

(6) Effective series resistance ($Res$)—the effective signal-current resistance of the two diodes in series.

A specific object of the invention is to provide a transistor tester which will permit any or all of the foregoing six operating characteristics of a transistor triode to be obtained by simple and reliable tests.

It has been chosen to illustrate the invention as embodied in a test set for testing a transistor triode of either NPN or PNP type under operating conditions by applying normal operating current through A.C.-isolating choke coils to the respective electrodes, while making parallel alternating-current signal connections to the electrodes through D.C.-isolating condensers.

An important feature of the invention is that the necessity for a precisely calibrated current or voltage meter is avoided, and precision is enhanced, by a comparison arrangement wherein any resistance value under observation is directly compared with a calibrated precision slide-arm resistor.

A further feature is that the test set is readily positioned for any one of the several tests of a transistor connected thereto, and that the necessary measuring and comparison adjustments may be made while the test set remains in that selected position. It has been chosen to employ a multi-brush rotary switch for positioning the test set, such switch being manually operable to positions corresponding respectively to the desired test positions of the test set.

A further feature is that the test set is arranged to employ standardized voice-frequency generating, amplifying, and indicating apparatus.

Other objects and features will become apparent as the description progresses.

THE DRAWINGS

Referring to the accompanying drawings, comprising Figs. 1 to 7;

Figure 1 shows the circuit arrangement of a six-position transistor test set embodying the invention; and Figures 2 to 7 show in schematic form the circuit arrangements specific respectively to test positions 1 to 6 of the test set of Fig. 1.

The apparatus of Fig. 1 is preferably all mounted in the same cabinet, or behind the same panel, with the manual control devices controllable from the front, from which position the visual indicating devices are visible. Fixed test terminals E, B, and C, as well as E′, B′, and C′, are also preferably accessible from the front of the device. Terminals E, B, C detachably receive a junction transistor TR for test, whose prongs or terminal conductors connect respectively thereto, and terminals E', B', C', detachably receive a point-contact transistor for test. Conductors 2 to 4 lead from the test terminals E, B, and C to the illustrated test apparatus.

The visual indicating instruments comprise (1) the checking D.C. voltmeter 300 connectable to test conductors 3 and 4 by push key K–3, (2) the A.C. voltmeter 400, which is the principal test-indicating instrument, and (3) the monitor 600 which is used to show the waveform of the signals responded to by the voltmeter 400. Generator 500 contains a 1000-cycle oscillator 501 for supplying 1000-cycle signal current for test purposes, and to exercise the necessary sweep control over monitor 600.

Supply unit 200 comprises the D.C. source of biasing current for the transistor under test. The associated key K–1 has contact sets 1 and 2 for reversing the output wires of unit 200 according to the polarity type (NPN or PNP) of the transistor being tested. Contact sets 3 to 8 of key K–1 are used to reverse the connections to each of the high-capacity electrolytic D.C.-blocking condensers 104 to 106, whereby each such condenser always has the same D.C. polarity across its terminals. High-inductance choke coils 101 to 103 are to prevent the flow to ground of A.C. signal currents reaching wires 8 to 10.

The six position rotary selector switch 120 is controlled by knob 121. It has nine brushes B1 to B9 for connecting the conductors 5 to 7 and associated conductors each to a separate circuit point for each of the six test postions of the test set. For this purpose, there are shown six horizontal rows of brush contacts, rows P–1 to P–6. The brushes (shown in position 1) are caused to contact the one of the horizontal rows P–1 to P–6 which corresponds to the desired test position.

Device PR is the precision slide-arm resistor previously referred to; key K–4 is used to change from comparing to testing; and resistors 111, 112, and 114 to 116 comprise precision resistors used in the testing and comparing operations as will be explained.

Functionally, the foregoing apparatus of Fig. 1 comprises two groups of circuits, a signal group and a bias group. The bias group of circuits establishes direct-current operating conditions for the transistor by way of conductors 8 to 10 and choke coils 101 to 103, while the signal group of circuits provides alternating-current circuit connections through conductors 5 to 7 and condensers 104 to 106 for measuring the characteristics of the transistor under test.

The group of signal-current measuring circuits includes the compare-test key K–4, the calibrated precision resistor PR, the 1000-cycle signal generator 500, the alternating-current voltmeter 400, and the associated monitor 600.

DETAILED DESCRIPTION

Figure 1:
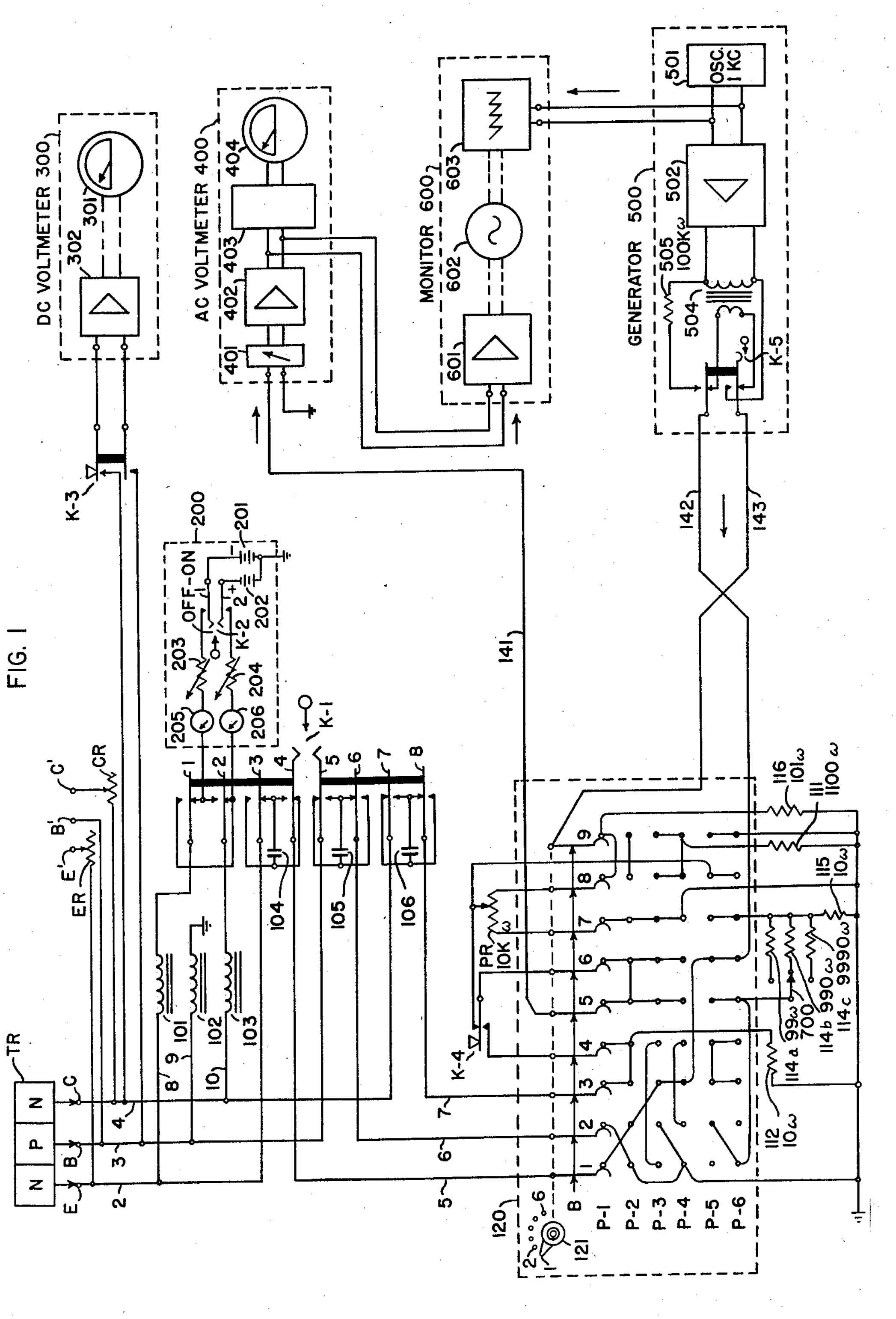

The invention having been described generally, a detailed description follows.

(*A*) *Junction type NPN test*

Referring to Fig. 1, the use of the test set in testing the NPN type junction transistor TR will now be described.

PREPARATION

With a transistor of NPN polarity connected to terminals E, B, and C, the polarity key K–1 is left in its illustrated normal position to supply a negative bias to terminal E and a positive bias to terminal C.

Off-on key K–2 is now closed to supply bias current to the emitter and collector electrodes of TR from the negative source 201 and the positive source 202, respectively, by way of resistors 203 and 204, meters 205 and 206, normal contacts 1 and 2 of key K–1, choke coils 101 and 103, conductors 2 and 4, and test terminals E and C. The two bias-current paths have a common return path to ground through the base electrode of TR, terminal B, conductor 3, and choke coil 102. Resistors 203 and 204 are now adjusted until meter 205 shows the desired negative emitter current and meter 206 shows the desired positive collector current. The negative emitter current is in the forward direction through the emitter diode of TR, while the positive collector current is in the reverse direction through the collector diode of TR, in accordance with the noted usual circuit use of a transistor. Incidental to the adjustment of resistors 203 and 204, key K–3 may be closed temporarily to enable D.C. voltmeter 300 (including D.C. amplifier 302 and meter 301) to show the D.C. voltage across the collector diode (terminals B and C), as a precautionary checking operation.

With normal direct current now flowing through the elements of transistor TR as described, six tests of TR may be performed as follows:

*Test 1: Grounded-base current-gain factor A.*—Referring to Figs. 1 and 2, with selector switch 120 in position 1 as shown (brushes B1 to B9 on contacts P–1), the test set is in position for the grounded-base current-gain factor A (or Alpha) to be ascertained.

In the generator 500, 1000-cycle current is supplied by oscillator 501, through amplifier 502, to step-down transformer 504. For tests 1, 2, 5, and 6, generator 500 is used as a low-impedance, low-voltage generator to provide a uniform voltage source during the necessary testing and comparing operations (hereinafter described) incidental to these four tests. Generator key K–5 is consequently left in its illustrated normal position for these four tests, being operated only for tests 3 and 4 to supply a higher generator voltage.

Continuing with test 1, 1000-cycle signal current now flows through the emitter diode of TR from the secondary winding of transformer 504 of generator 500 through the normal contacts of K–5, and generator wires 142 and 143. From wire 142, the path to the emitter electrode is through brush B1 of switch 120, conductor 5, normal contact 4 of key K–1, condenser 104, normal contact 3 of K–1, conductor 2, and through terminal E to the left-hand, or emitter electrode of TR. Thence, the flow is through the base electrode of TR, terminal B, conductor 3, normal contact 5 of K–1, condenser 105, normal contact 6 of K–1, conductor 6, and brush B2 of switch 120 to ground. Thence, the main return flow is through the 101-ohm resistor 116, brush B9, and over conductor 143 to generator 500. The 10,000-ohm resistor PR is in parallel with resistor 116 through brushes B7 and B8, the parallel resistance of PR and 116 being 100 ohms for test convenience.

The 1000-cycle signal current flowing through the emitter diode over the traced path comprises A.C. variations superimposed on the normal D.C. emitter bias current over wire 8. These variations cause corresponding variations in the resistance of the collector barrier of TR, through which the collector bias current is flowing. The result is a 1000-cycle collector signal current which flows in a circuit path from the right-hand (collector) electrode of transistor TR, through terminal C, conductor 4, normal contact 7 of K–1, condenser 106, normal contact 8 of K–1, conductor 7, brush B3, 10-ohm resistor 112, to ground. Thence, the return flow is through brush B2, conductor 6, normal contact 6 of K–1, condenser 105, normal contact 5 of K–1, conductor 3, terminal B and base electrode, to the collector electrode of TR.

A.C. voltmeter 400 has one input conductor grounded as shown, its other input conductor being 141. In 400, these input wires lead through adjustable attenuator 401, amplifier 402, and rectifier 403 to meter instrument 404. Externally, input wire 141 of voltmeter 400 leads through brushes B5 and B6 (position 1) to the lever arm of key K–4.

In order to obtain a test reading on voltmeter 400 of the collector signal current, key K–4 is now operated. The lever arm thereof transfers the voltmeter-input wire 141 to the ungrounded terminal of the 10-ohm resistor 112, which is in the previously traced collector-current path.

The voltage drop to ground across resistor 112 is thus impressed on input wire 141 of voltmeter 400, which is preferably of such high input impedance that the current it draws is negligible. This signal voltage passes through items 401, 402, and 403 to meter 404, which gives a voltage reading depending on the value of the collector signal current through 112.

The signal voltage, as amplified by 402, is supplied to monitor 600, whereat it passes through amplifier 601 to reach the cathode-ray display tube 602. This tube is also controlled by the 1000-cycle sweep generator 603, kept in step by a portion of the output of oscillator 501 in generator 500. Tube 602 thus displays the wave form of the collector current as shown by the output voltage amplifier 402. The collector signal current is adjusted to a suitable non-clipping, or non-distortion, value by adjusting emitter signal current, which is effected by adjusting the voltage output to the emitter circuit by generator 500. For this purpose, a gain-control device (not shown) is provided in amplifier 502, and is now adjusted until tube 602 of the monitor 600 shows a sine wave input to voltmeter 400.

Attenuator 401 is now adjusted to give a convenient test value to the reading on meter instrument 404 of meter 400.

Having noted the adjusted test reading (for collector signal current) on instrument 404 of voltmeter 400, the operator now releases the key K–4 and adjusts precision resistor PR to give the same reading at voltmeter 400 for the emitter signal current. When key K–4 is released, it disconnects the voltmeter-input conductor 141 from resistor 112 and reconnects it to the slide arm of resistor PR. The 10,000-ohm resistor PR, in parallel with 101-ohm resistor 116, comprises a 100-ohm resistor in series with the emitter signal-current path hereinbefore traced. The voltage drop per unit signal current through this 100-ohm resistance path is ten times the drop per unit signal current through the 10-ohm resistor 112 in the collector signal-current path, thereby permitting a current-gain factor of ten to be observed when the slide arm of PR is at its B8 position. For this test, this value is higher than that of any transistors commonly produced.

With the B7 terminal of PR now grounded, and assuming that the slide arm is calibrated decimally from 0 at its B7 terminal to 1 at its B8 terminal (as 0.0, 0.1, 0.2, etc. . . . 0.09, 1.0), the setting of slide arm PR to supply the same voltage to wire 141 (to give same reading at 400) as was supplied to it across resistor 112 with key K–4 depressed, must be multiplied by ten to give the gain factor of this test.

The key K–4 may be depressed and released as many times as desired to check the current-gain factor A indicated by the above setting of the slide arm of PR.

*Test 2: Grounded-emitter current-grain factor B*.—Refering to Figs. 1 and 3, the knob 121 is rotated to its position 2 for test 2, thereby rotating brushes B1 to B9 from their contacts P–1 to their contacts P–2. With generator key K–5 left in its normal position, the associated circuit arrangement is in readiness for tests to ascertain the grounded-emitter current-grain factor B (or Beta).

The 1000-cycle input signal current now flows from generator 500 to the base electrode of transistor TR, over conductor 142 and brush B2. Thence the return flow of input signal current may divide, with a small portion returning through the collector electrode and resistor 112 to ground. The major return flow of input signal current, however is through the emitter electrode of TR and brush B1, to ground. From ground, the combined return flow to generator 500 is through the 10,000 ohm resistor PR, brush B9, and conductor 143. This 1000-cycle input current causes a responsive 1000-cycle output signal current which flows in a path from ground, to the collector electrode by way of the emitter and base electrodes, and is thence through brush B3 and the 10-ohm resistor 112, to ground.

In order to obtain an output-current voltage reading on voltmeter 400, key K–4 is operated to connect the ungrounded terminal of the 10 ohm resistor 112 (in the output circuit) to the input wire 141 of voltmeter 400. The output of generator 500 may be again adjusted for a suitable voltage which gives distortionless output signal-current, and voltmeter 400 is adjusted to give a convenient reading, as described.

Key K–4 is then released to reconnect the voltmeter input wire 141 to the slide arm of resistor PR, which is in the traced input circuit. The slide arm of PR is now adjusted to give the same reading on meter 400 for the input signal current as that obtained for the output signal current.

With the slide arm of PR calibrated from 0 to 1 as assumed, since the 10,000-ohm output current resistance at PR is 1000 times the 10-ohm input-current resistance at 112, the reading of PR is multiplied by 1000. Thus, a full-scale reading at PR, if obtained on this test, would show a grounded-emitter current-gain factor B of 1000, whereas junction transistors as commonly produced do not provide gain factor B of more than 300, and usually less.

*Test 3: Base resistance Rb*.—Referring now to Figs. 1 and 4, brushes B1 to B9 of switch 120 are moved to their contacts P–3 of Fig. 1, to position the test set for test 3, to measure the base resistance R*b*, and generator key K–5 is operated to transfer generator wires from the secondary winding of 504, to the direct higher voltage output of amplifier 502, by way of the 100,000-ohm limiting resistor 505, thereby enabling generator output appropriate to the test to be obtained.

In test position 3, output conductor 143 of generator 500 is connected to ground through brush B9 and the 1,000-ohm resistance combination comprising the 1,100-ohm resistor 111, with which the 10,000-ohm resistor PR is parallelly connected by brushes B7 and B8. Current from generator 500 now flows over the generator output conductor 142, brush B3, and through the collector and base electrodes, to ground through brush B2.

Key K–4 is now operated to transfer voltmeter wire 141, through brushes B4 and B1, to the emitter electrode of TR. The voltage drop to ground of the input current through the resistance of the base element appears on the emitter electrode, and thus reaches the voltmeter 400.

The output of generator 500 may be again adjusted for a suitable sine wave at 600, and voltmeter 400 is adjusted to give a convenient reading, as described.

Key K–4 is now released to reconnect voltmeter 400 to the slide arm of resistor PR, and this slide arm is adjusted to give the same reading on voltmeter 400 as with key K–4 operated.

With the assumed calibration of the slide arm of resistor PR from 0 to 1 and since the parallel resistance of 111 and PR (in the input path) is 1,000 ohms, the reading of PR is multiplied by 1,000 to give the ohmic value of the base resistance R*b*.

*Test 4: Emitter resistance Re*.—Referring now to Figs. 1 and 5, brushes B1 to B9 of switch 120 are moved to their contacts P–4 of Fig. 1, to position the test set for test 4, to measure the emitter resistance R*e* as hereinbefore defined, and the generator key K–5 is left (or placed) in operated position as for test 3.

As in test 3, output conductor 143 of generator 500 is connected to ground through brush B9 and the 1,000-ohm parallel resistance combination comprising resistors PR and 111, but voltmeter conductor 141 is now connected through brush B2 to the base electrode to enable the drop across the emitter barrier and the emitter electrode, in series, to be impressed on voltmeter 400.

The generator current through resistors 111 and PR has its return circuit through the three electrodes of TR in series, to ground by way of brush B1, and thus does not traverse the base-electrode terminal B.

When key K–4 is now operated, it connects voltmeter conductor 141 through brushes B4 and B2 to the base electrode of transistor TR. The voltage drop to ground through the emitter barrier and the emitter electrode, in series is thus placed on wire 141.

With the generator current and the reading of voltmeter 400 adjusted as described, key K–4 is released to transfer the voltmeter wire to the slide arm of PR, which is now adjusted to give the same voltmeter reading as with K–4 operated.

As pointed out for test 3, the assumed scale reading of the slide arm of PR is multiplied by 1,000 to give the ohmic value of the emitter resistance R*e*.

*Test 5: Collector resistance Rc.*—Referring to Figs. 1 and 6, the brushes B1 to B9 are moved to their contacts P–5 to position the test set to measure the collector resistance R*c*. Generator-output key K–5 is restored (or left restored) to connect generator wires 142 and 143 to the low-voltage secondary winding of transformer 504, thereby giving a low-impedance output of substantially constant voltage, as in all tests except Nos. 3 and 4.

Key K–4 is now operated, closing the following path for generator current: From ground through brush B9, generator 500, brush B6, alternate contact of K–4, brushes B4 and B3, collector and base electrodes of TR, and thence to ground through ratio switch 700, one of the resistors **114*a*—114*c*, and the 10-ohm resistor 115. If ratio switch 700 is on its 100-to-1-ratio contact 2, the 990-ohm resistor 114*b* is in circuit, and the voltage drop across the 1000-ohm series resistance of 114*b* and 115 is impressed on meter 400 through brush B5. Amplifier 502 and attenuator 401 are now adjusted to give a desired reading on voltmeter 404. Then, one portion of the voltage of generator 500 is across the shunted voltmeter 400**, with the remainder across the collector resistance of TR.

The key K–4 is now released, thereby transferring the generator 500 from the collector circuit of TR to a circuit path through the slide arm of PR, the low-scale portion of PR, brush B7, and the 10-ohm resistor 115, to ground. The voltage drop across the 10-ohm resistor 115 is now impressed on voltmeter 400 through resistor **114*b* and brush B5. PR, acting as a series load resistor, is now adjusted to give the same voltage-drop reading on voltmeter 400 across the 10-ohm resistor 115 as that obtained (with key K–4 operated) across the 1000-ohm combination of 114*b* and 115. With the adjusted equal voltage readings, the current now flowing through PR is 100 times (or 1000/10) the current through the collector path, but the voltage drop across PR is the same as that across the collector resistance with K–4 operated. Consequently, the tested collector resistance of TR is 100 times the adjusted resistance of PR. Since the maximum adjusted resistance of PR is 10,000 ohms, the maximum observable collector resistance, when switch 700 is on its contact 2**, as shown, is ten times that value, or 1 megohm, which is in excess of the collector resistance encountered for most junction transistors.

The 10-to-1-ratio position 1 of ratio switch 700 is preferred when the collector path has a sufficiently low resistance that the voltage drop across the 100-ohm series combination of resistors **114*a* and 115 (with K–4 operated) is enough to give a satisfactory test reading at 400. The resistance ratio is now 10 to 1 since the 90-ohm resistance of 114*a*, plus the 10-ohm of 115, is ten times the resistance of 115** alone. A 100,000-ohm reading may be thus obtained.

The 1000-to-1-ratio position 3 of ratio switch 700 is for use only when the resistance value under test is so high (above one megohm) that a comparative reading cannot be obtained with position 1 or 2 of 700. In position 3, the drop in test resistance (with K–4 operated) is through the 10,000-ohm series resistance of **114*c* and 115, which is 1000 times the comparing drop through the 10-ohm resistor 115**. A 10-megohm reading may thus be obtained.

*Test 6: Effective series resistance Res.*—Referring to Figs. 1 and 7, brushes B1 to B9 are placed in position 6 to position the test set to measure the effective series resistance R*es* of TR. Test 6 is similar to test 5 except that, with K–4 depressed in test 6, the return path to ground for generator 500 is through the emitter diode and brush B1, rather than directly from the base electrode and brush B2, as in test 5, whereby the emitter diode is connected in series with the collector diode to enable the effective resistance of the two diodes in series to be ascertained. As in test 5, the ratio switch 700 is preferably set on the appropriate one of its three contacts to include the lowest-valued one of the multiplying resistors **114*a* to 114*c*** which will suffice.

The effective series resistance as ascertained in test 6 is less than the sum of the emitter and collector resistances, as separately ascertained in tests 4 and 5, by an amount depending upon the ability, in the transistor under test, of the signal current through the emitter diode to generate (by the usual resistance variations) a resultant signal voltage at the collector barrier. The resultant signal voltage, being in phase with the current, is in phase with the voltage supplied by generator 400, and the two voltages are thus additive. The current is thus increased with respect to the voltage of generator 500, thereby giving a measured series-resistance value for R*es* which is less than the actual resistance of the path by an amount depending upon the value of the said resultant voltage. The amount by which the actual series resistance and the effective series resistance of TR differ is its so-called mutual resistance, which is given by the formula, $Rm=Eo/Ii$, where E*o* is the output signal voltage resulting from an input signal current through the emitter diode, and where I*i* is that input current. Thus, if R*ef* is the test-6 value of the effective series resistance, then *Rm* equals (*Re* plus *Rc*) minus *Ref*.

A high value obtained in test 5 for collector resistance RC, may be inaccurate because of small leakage paths and stray capacitances. Then, a more accurate value for R*c* may be calculated by using the result of test 6 and the result of either test 1 or test 2 in a well-known formula. Thus, while the result of test 5 or of test 6 can be calculated from the results of other tests where accuracy is not in doubt, the actual results of tests 5 and 6 permit each other to be checked in comparison with the results of other ones of the six tests.

SUMMARY OF PROCEDURES—TESTS 1 TO 6

Important points in the foregoing tests 1 to 6 may be summarized as follows:

(1) *Generator voltage.*—In tests 1, 2, 5, and 6, output key K–5 of generator 500 is in its illustrated normal position, wherein wires 142, and 143 and supplied through the low-turn secondary of step-down transformer 504, to provide a source of voltage which remains substantially constant under the load variations encountered during these tests. But, in tests 3 and 4 the output key K–5 is operated to transfer generator wires 142 and 143 to the relatively high-voltage output of amplifier 502, since a high voltage (not required to be uniform under varying loads) is required to drive enough current through the collector resistance to enable the resulting voltage drop across the relatively low base or emitter resistance to be accurately observed.

(2) *Voltmeter-transfer tests 1 to 4.*—In tests 1 to 4, generator 500 supplies current to a single path which includes two of the electrodes of the transistor TR in series with a comparison resistance combination which includes, or comprises, the adjustable precision resistor PR. Also, a test conductor (at B4) is connected to the third electrode of TR, from which a reading is taken on voltmeter 400, with K–4 operated. When K–4 is released, voltmeter-input wire 141 is transferred to the comparison resistance combination, and resistor PR therein is adjusted to give the same reading on voltmeter 400 as with key K–4 operated.

In each of the tests 1 to 4, the test voltage taken off the noted third electrode of TR is the drop across a resistance. For tests 1 and 2, where input and output currents are compared, this dropping resistance is the known 10 ohms of resistor 112. For tests 3 and 4, where resistances are compared to find the resistance of a desired portion of TR, the noted dropping resistance is the resistance of that portion.

In all four of the tests 1 to 4, PR is used as a potential divider, and the comparison setting (for an equal reading at 400) is made by sliding the calibrated arm of PR. As explained for the respective tests, the comparison setting of PR is interpreted as indicating a current ratio or as indicating a resistance value, and that setting is multiplied by a suitable factor according to the circuit connections involved.

(3) *Generator-transfer tests 5 and 6.*—In tests 5 and 6, instead of providing a single path for current from generator 500 and transferring the voltmeter from one voltage-drop point to another as in tests 1 to 4, two paths for generator current are provided, and are closed alternatively (by key K–4), while the voltmeter remains connected to the same points for both testing and comparing. At those points, it is connected across the series combination of resistor 115 which is common to both paths, and the one of the resistors 114*a* to 114*c* which is inserted in the test path by ratio switch 700. Thus, the fixedly connected voltmeter 400 receives the drop across resistor 114 and resistor 115 in series when the test path is closed, but receives the drop across alone when the comparing path is closed, whereby the multiplication factor for which switch 700 is set is obtained with a fixedly connected voltmeter.

(B) *Junction type PNP test*

The foregoing tests 1 to 6 for the NPN junction transistor TR may be performed in the same way for a PNP junction transistor connected to terminals E, B, and C, except that key K–1 is actuated to reverse the biasing potentials applied to the emitter and collector electrodes E and C. With key K–1 operated, resistor 204 is adjusted to cause meter 206 to read according to the desired emitter bias, and resistor 203 is adjusted until meter 205 shows the desired bias current through the collector electrode. Contacts 3 to 8 of K–1 reverse the connections to electrolytic blocking condensers 104 to 106 to correspond to the reversed polarity of bias current.

(C) *Point-contact transistor test*

A point-contact transistor may be tested as described for junction transistors by connecting its electrodes to terminals E, B, and C. For the described tests 1 and 2, however, some point-contact transistors may oscillate, or nearly so, because of interaction between the input and output circuits across the higher base resistance of such transistors. An additional, or compensating resistance must therefore be introduced in the input and/or output signal circuits.

The test set of Fig. 1, while designed primarily for testing junction transistors, is shown adapted for the testing of point contact transistors through the second set of test terminals E′, B′, and C′, together with the adjustable series emitter resistor ER and the adjustable collector resistor CR. Resistors ER and CR are set to respective resistance values according to the rating of the point-contact transistor to be tested through terminals E′ to C′, and the resistors 203 and 204 are set to give the desired bias currents therethrough. The readings for the described tests 1 to 6 through terminals E′, B′, and C′ are corrected according to the adjusted resistance values at ER and CR.

I claim:

1. A transistor test set comprising, in combination, test conductors for the respective electrodes of a transistor to be tested, means including bias conductors for delivering bias current over the respective test conductors to said electrodes, respective alternating-current blocking devices serially connected in said bias conductors, means including signal conductors for carrying alternating signal current over the respective test conductors between the test set and the electrodes of the connected and biased transistor, respective direct-current blocking devices serially connected in the signal conductors, an alternating-current signal generator, a precision resistor having two fixed terminals and a slide-arm terminal, a high-impedance alternating-current voltmeter, a multi-conductor test-position switch and means for setting it into any desired one of a number of test positions corresponding respectively to desired predetermined tests of a connected transistor, tie conductors variously interconnecting the last said positions of the test-position switch with the said signal conductors, signal generator, precision resistor, and voltmeter, according to the respective tests to which such positions correspond, one tie conductor being a reference conductor, said switch and certain of said tie conductors providing in any last said switch position a first path from the reference conductor through the fixed terminals of the precision resistor and said generator, in series, to a first said signal conductor, and providing a second path from said reference conductor to a second said signal conductor, one terminal of said voltmeter being connected to said reference conductor, and comparison means and means including said switch and other ones of said tie conductors rendering it effective in any last said test position for connecting the other terminal of the voltmeter alternatively to the slide arm of said resistor and to a third said signal conductor, said slide arm being movable to a position at which the voltmeter reads the same in both of said connected positions thereof.

2. In a transistor test set according to claim 1, multiplier resistors, and means including the said switch for selectively connecting them in shunt of the fixed terminals of the precision resistor in respective selected positions of the said switch.

3. In a transistor test set according to claim 1, a wave-form monitor and means for operatively associating it with the said voltmeter to display the wave form of the signal voltage received by the voltmeter.

4. In a transistor test set according to claim 3, means for regulating the output of the signal generator to secure a sine wave signal voltage at the voltmeter and monitor.

5. In a transistor test set according to claim 1, means for adjusting the sensitivity of the voltmeter to secure a convenient reading thereof.

6. In a transistor test set according to claim 1, a multiplying resistor and a dropping resistor, said test-position switch having at least one other position wherein it connects the voltmeter between a first signal conductor and the reference conductor, and connects the multiplying resistor and the dropping resistor in series between said first signal conductor and the reference conductor, with the dropping resistor adjacent to the reference conductor, said test-position switch including means rendering said comparison means effective to close two paths for said generator alternatively, one path being from the reference conductor to a selected second signal conductor, while the other path is from the reference conductor to the junction of the multiplying and dropping resistors by way of the slide-arm terminal and one fixed terminal of the precision resistor.

7. In a transistor test set according to claim 6, there being a plurality of said multiplying resistors, and switch means for selectively connecting them in series with said dropping resistor.

8. A transistor test set comprising, in combination, three test conductors for respective electrodes of a transistor to be tested, means including three bias conductors for delivering bias current over the respective test conductors to said electrodes, respective alternating-current blocking devices serially connected in said bias conductors, means including three signal conductors for carrying alternating signal current over the respective test conductors between the test set and the electrodes of the connected and bias transistor, respective direct-current blocking devices serially connected in the signal conductors, a reference conductor, an alternating-current signal generator, an alternating-current measuring device, and means including selective switching means for connecting the generator between the reference conductor and either selected one of a given two of the three signal conductors, while connecting the reference conductor directly to the other one of the said given two signal conductors and connecting the measuring device between the reference conductor and the third one of the three signal conductors.

9. A transistor test set comprising, in combination, three test conductors for respective electrodes of a transistor to be tested, means including three bias conductors for delivering bias current over the respective test conductors to said electrodes, respective alternating-current blocking devices serially connected in said bias conductors, means including three signal conductors for carrying alternating signal current over the respective test conductors between the test set and the electrodes of the connected and biased transistor, respective direct-current blocking devices serially connected in the signal conductors, a reference conductor, an alternating-current signal generator, an alternating-current measuring device, and means including selective switching means for connecting the generator between the reference conductor and any said signal conductor, while connecting a second said signal conductor to the reference conductor and connecting the measuring device between the reference conductor and the third said signal conductor.

References Cited in the file of this patent

"Production Tester for Transistors," "Electronics" magazine, volume 23, issue 10, October 1950, pp. 96–99.

"Test Techniques for Transistors," "Radio-Electronics" magazine, volume 24, No. 3, March 1953, pp. 78–80, 82, 84.